106. COMPOSITIONS, COATING OR PLASTIC.
Patented Jan. 28, 1930

1,744,869

UNITED STATES PATENT OFFICE

ROY CROSS, OF KANSAS CITY, MISSOURI, ASSIGNOR TO SILICA PRODUCTS CO., OF LOS ANGELES, CALIFORNIA, A CORPORATION OF DELAWARE

WATERPROOF CONCRETE AND PROCESS OF MAKING SAME

No Drawing.        Application filed April 20, 1925.   Serial No. 24,687.

This invention relates to improvements in waterproof concrete and a method for producing same, and refers more particularly to a concrete in which an asphaltic or bituminous substance is thoroughly interspersed through the voids of the set concrete by being incorporated in the mix in a pulverulent state and subsequently being fused by heat in order to close or seal the voids created by the evaporation or elimination of water from set concrete.

The invention has a particular adaptation to concrete blocks or forms, floors or walls, including covering material for girders and beams in which the concrete mix is made of relatively porous material or to concrete of any character which is to be waterproofed. The invention will improve materially the character of lightweight concrete at the present time being adapted on a large scale for both interior and exterior walls and for steel beam coverings in which the aggregate is formed of a porous material such as a concrete mix containing as a filler cinders, "Haydite" (a clay or ceramic material heated to intumescence).

As mentioned, the purpose of this invention is to make a formed object of concrete such as concrete blocks, monolithic forms including wall construction, floors, pavement wearing surface, etc., in which bituminous material having a melting point between air temperature and 400° F. is used. This bituminous material would be incorporated in a sufficient quantity in the wet mix in a solid pulverulent or dispersed form. The concrete would set in the normal manner as there is nothing in the bituminous material which would have a retarding effect. After being thoroughly set, the concrete would then be baked at a temperature sufficient to cause the bituminous material to fuse. This fused substance, in a liquid or semi-liquid state throughout the body of the concrete, would seep or intersperse itself throughout the voids of the concrete,—acting as an additional cementing material and giving to the concrete material complete waterproof property.

It is of advantage, under certain conditions, particularly with the use of a light filler such as cinders or heat sintered clay, to incorporate the bituminous material as an additional waterproofing material to a gelatinous clay waterproofing which improves the mixing quality of the lighter fillers into the concrete mix and prevent stratification of the ingredients in addition to having the effect of waterproofing the set concrete. Bituminous material incorporated into a mix of this character, containing a gelatinizing clay, would have the advantage of supplying additional strength to the set material in that it would serve as a bonding medium when fused. It will be understood that the bituminous material may be used without the clay in a concrete aggregate utilizing a light filler such as heat treated clay or cinders, but it has been found that a more satisfactory mix can be prepared where the gelatinizing clay is used.

A typical bituminous material that would be useful for this purpose would be a brown, powdered asphalt such as has been found naturally in Colorado. This asphalt is in a dry, pulverulent condition having the appearance of diatomaceous earth. Such an asphalt readily disintegrates between the fingers and can be pulverized to a high degree of fineness. There also occur certain natural asphalts appearing as black masses often with colloidal mixture which may be pulverized to produce a wet brown pulverized bituminous material for this purpose. Artificial materials may be prepared by disintegrating solid blown asphaltic residues and semi-solid asphaltic residues produced from asphaltic or petroleum residues. Such materials typical of the above would include the following: Graphamite, Trinidad, Albertite, Tabbyite, gilsonite, Bermudez, Manjak, and other natural solid and semisolid asphalts, also pressure still pitch, petroleum residues, coal tar pitch, blown asphalt and other artificial solid or semi-solid bituminous substances.

Such materials may be pulverized to a brownish black powder or may be ground in the presence of water to a colloidal condition. A typical mixture as used for making one cubic foot of light waterproofing, yet strong, concrete would be as follows:

| | Pounds |
|---|---|
| Portland cement | 12 |
| Fine aggregate, preferably cinders or "Haydite" (clay or ceramic products heated to intumescence), passing a ¼" mesh screen | 24 |
| Coarse aggregate preferably such as "Haydite" or cinders retained on a ¼" mesh screen | 48 |
| Pulverized bituminous material having a melting point preferably over 150°F. | 3–5 |
| Artificial gelatinous silicate or natural gelatinizing clay as found in Wyoming, California and Colorado | 1 |

Water in sufficient quantities to give a uniform plastic mix and not enough to cause segregation of the aggregate and water.

A desirable method is to thoroughly mix the gelatinizing clay with the disintegrated bitumen before adding them to the other ingredients. This will retard or prevent premature or immediate contact of the clay and water. As described, the gelatinous clay may be omitted if desired where a uniform plastic mix can be produced without it, as in the case of a rich mix of sand and rock concrete.

While the invention has been described more completely in connection with the preparation of light-weight concrete, it is understood that the invention is as applicable to concrete where the common type of heavier aggregate, such as limestone or natural rock filler, is used.

I claim as my invention:

1. A concrete mix comprising hydraulic cement, mineral aggregate, a gelatinizing clay and solid bitumen in a pulverulent condition capable of filling the voids of the set concrete.

2. Set concrete comprising hydraulic cement, a mineral aggregate, a gelatinizing clay and a solid bituminous material fused into the voids of the concrete.

3. Formed objects of concrete containing hydraulic cement, a mineral aggregate, a gelatinizing clay, and having a solid waterproofing material fused into the voids of the concrete.

4. A process of making waterproof concrete consisting in preparing a mix containing hydraulic cement, a mineral aggregate, a gelatinizing clay and a bituminous material in a discrete form, permitting the mix to set and heating to a temperature to fuse the bituminous material.

ROY CROSS.